Aug. 3, 1943.                  C. B. MOORE                    2,325,967
                          AIR CONTROL INSTRUMENT
                Filed Oct. 24, 1939            2 Sheets-Sheet 1

INVENTOR.
COLEMAN B. MOORE
BY George M. Munschamp
ATTORNEY

Aug. 3, 1943.  C. B. MOORE  2,325,967
AIR CONTROL INSTRUMENT
Filed Oct. 24, 1939  2 Sheets-Sheet 2
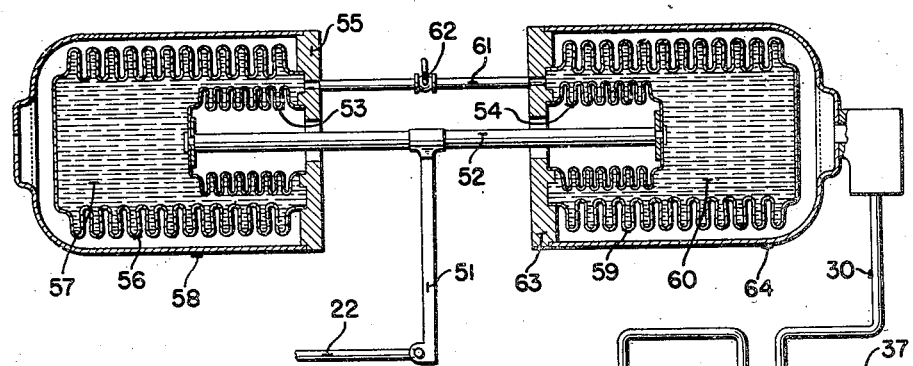
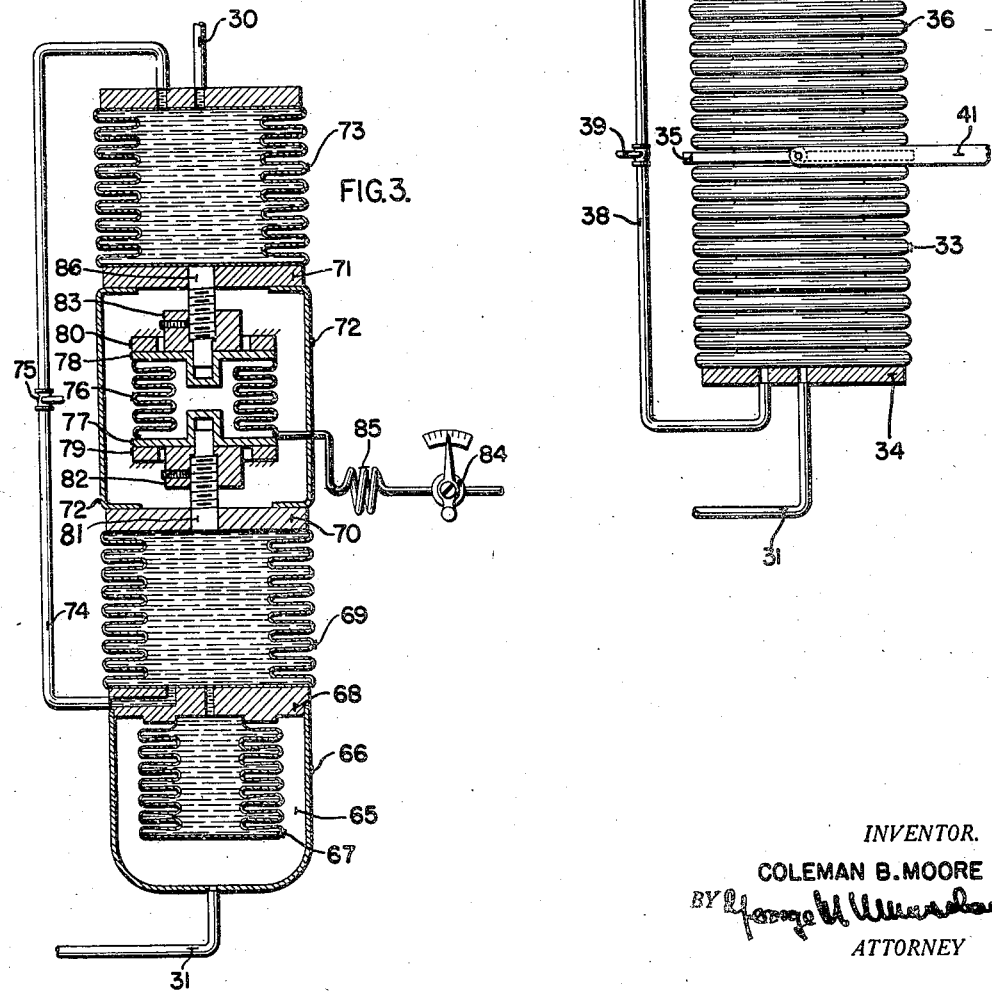
INVENTOR.
COLEMAN B. MOORE
ATTORNEY Patented Aug. 3, 1943

2,325,967

UNITED STATES PATENT OFFICE 2,325,967

AIR CONTROL INSTRUMENT

Coleman B. Moore, Carroll Park, Pa., assignor to The Brown Instrument Company, Philadelphia, Pa., a corporation of Pennsylvania Application October 24, 1939, Serial No. 300,961

5 Claims. (Cl. 236—86)

The present invention relates to air control apparatus of the type comprising an element deflecting in accordance with changes in the value of a controlling quantity or condition which may be pressure, temperature or other measurable variable, and means through which deflection of said element from the predetermined or normal value position of the element varies an air or other fluid pressure constituting a control force, and simple and effective fluid pressure means through which variation in said control force modifies the action of said element on the first mentioned means so as to effect suitable corrective variations in the control force on a departure of the latter from its predetermined or normal value, without creating an objectionable tendency to unstable control or hunting.

A specific object of the present invention is to provide a control action in which a relatively large initial kick or control action may be made on a change in a controlling quantity, while avoiding the tendency to hunting which would result from such a large initial adjustment if the control system did not include provisions for a suitable subsequent follow-up adjustment. In accordance with the present invention, the period of each initial kick effect is prolonged by provisions which are made for delaying the succeeding follow-up adjustment.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 2 is a view of another embodiment; and

Fig. 3 is another embodiment in which the follow-up is produced hydraulically.

Figure 1:
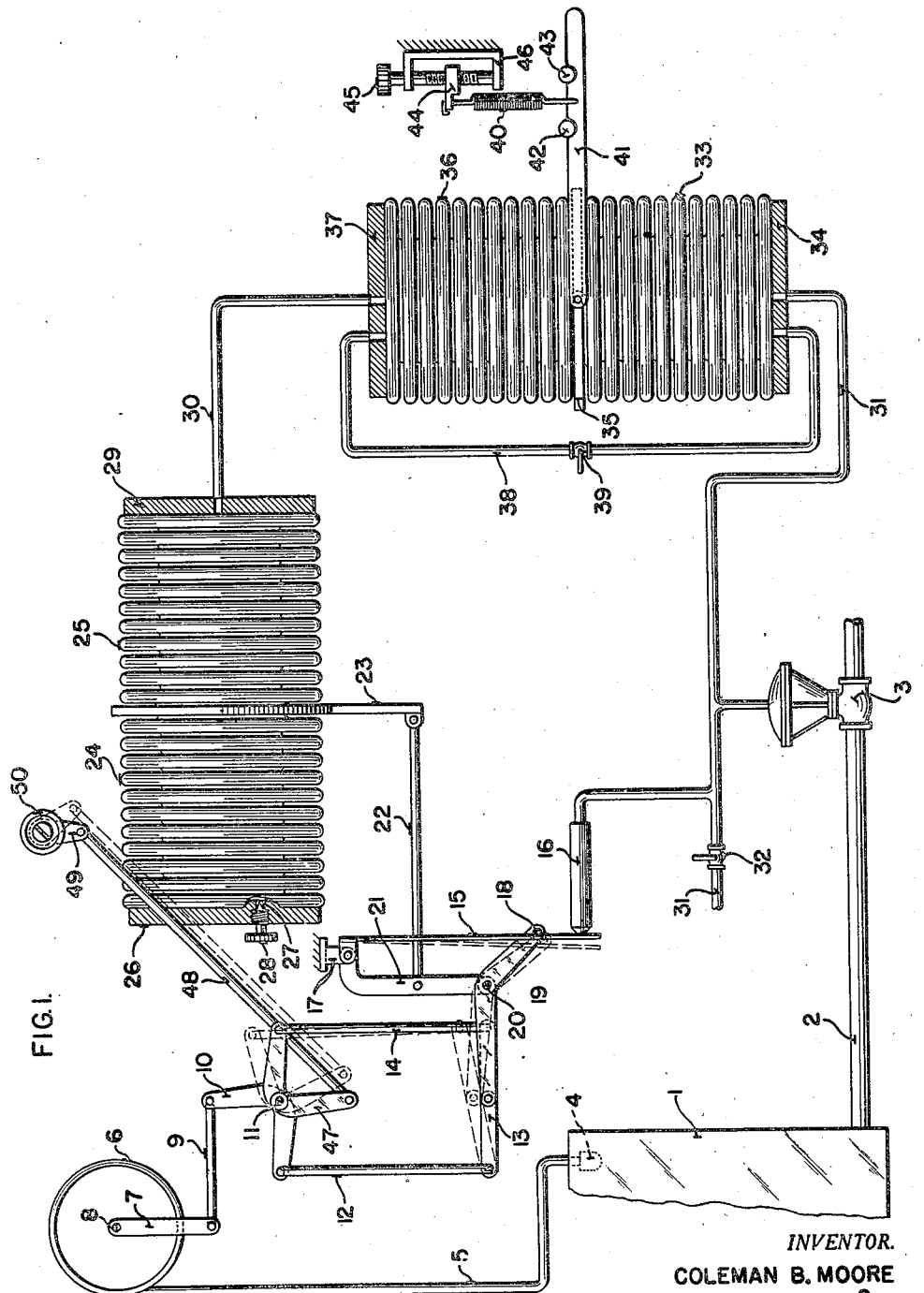
Fig. 1 is a view of a control system embodying one form of my invention.

Referring first to Fig. 1 where there is shown, by way of example, a temperature control system. A heater 1 whose temperature is to be regulated has it changed by varying the flow of a heating fluid thereto through a pipe 2 by an air controlled valve 3. This valve is provided with a diaphragm upon which varying air pressures are applied to change its opening in a well known manner, an increase in pressure serving to open the valve. Located within the furnace and subject to the temperature thereof is a bulb 4, filled with a liquid that expands upon an increase in temperature. This bulb is connected by a capillary 5 with the fixed end of a Bourdon tube 6 in the form of a helix. This tube unwinds upon an increase in pressure therein to move a lever 7, fastened to its free end, around an axis 8 in a counter-clockwise direction upon a decrease in temperature and in a clockwise direction upon an increase in the temperature of the heater 1.

Movement of the lever 7, through a link 9, rocks a bellcrank 10 around its pivot 11 and through the link 12 pivots a lever 13 around a support 14. As the lever 13 moves it adjusts a flapper valve 15 relative to a nozzle 16 a vary the pressure applied to the diaphragm of valve 3 in a manner presently to be described. The flapper 15 is pivoted at 17 and has a natural bias toward the nozzle 16, which bias is overcome by a pin 18 on one arm of a bellcrank 19, pivoted at 20 on a lever 21 that is also pivoted at 17. The second arm of bellcrank 19 is attached to and moved by the lever 13.

The flapper 15 is also moved by movement of the lever 21 by means of a link 22 attached to an extension of a movable plate 23. This plate is attached to the ends of a pair of opposed bellows 24 and 25. The former of these is fixed to a plate 26 that has an opening 27 therethrough communicating with the atmosphere, which opening is adjusted by a restrictor 28. The second bellows 25 has its other end attached to a plate 29 that has an opening therein communicating with a pipe 30.

Air is supplied to the nozzle 16 and the valve 3 from a supply line 31, past a restriction 32, and this same pressure is applied through an extension of line 31 to the interior of a bellows 33 that has its lower end supported by a plate 34. The upper end of bellows 33 is attached to a movable plate 35, whose movement, along with that of bellows 33 is opposed by a second bellows 36 that has its upper end fixed to a plate 37. The plate 37 is provided with an opening by means of which the line 30 may communicate with the interior of bellows 36. The interiors of bellows 34 and 36 are in communications by means of a pipe 38 that has within it an adjustable restriction 39.

Initial expansion or contraction of the bellows 33, when the pressure within it is changed is delayed by means of a spring 40 that acts on a lever 41 which is pivoted to the plate 35. The lever 41 is provided with two fulcrum points that are formed by pins 42 and 43 which receive notches in the lever 40. As the plate 35 moves upwardly it will pivot around pin 42 against the tension of spring 40 and as the plate 35 moves downwardly it will pivot around the pin 43 against the tension of the spring.

Spring 40 may be adjusted to vary the pressure change in bellows 33 necessary to move the plate 35 by shifting a block 44 to which the upper end of the spring is attached. The block is in threaded engagement with a screw member 45 that is supported in a bracket 46.

In the operation of the instrument upon, for example, a decrease in the temperature of the heater 1 the Bourdon tube 6 will contract and shift link 9 to the left. This will, through the connected lever and link mechanism, move pin 18 to the right permitting the flapper 15 to move toward the nozzle 16 throttling the flow therethrough and increasing the pressure in the line 31. Such an increase in pressure builds up on the diaphragm of valve 3 to open that valve and permit more heating fluid to flow to the heater 1. At the same time pressure builds up in the bellows 33, but has no immediate effect thereon. When, however, the pressure in the bellows 33 is sufficient to overcome the force of spring 40 that bellows will expand and correspondingly compress the bellows 36, forcing air therefrom through line 30 into bellows 25 to correspondingly expand the latter.

Expansion of bellows 25 moves plate 23 to the left, and through link 22, pivots the lever 21 carrying the bell-crank 19 clockwise so that the pin 18 will move the flapper 15 away from the nozzle 16, preventing any further increase in the valve pressure. The movement of the plate 23 to the left compresses bellows 24, increasing the pressure therein above that of the atmosphere. Therefore, air will escape through the opening 27 at a rate determined by the setting of restrictor 28, producing a further, slow movement of plate 23 and pin 18 to the left thus reducing the pressure of the air on valve 3 to a lower point.

Contemporaneously with the initial building up of pressure in the bellows 33 air will begin to leak through the pipe 38 into bellows 36 at a rate determined by the adjustment of restriction 39 to gradually equalize the pressure in bellows 33, 36 and 25. This equalization process is speeded up by the movement of the flapper away from the nozzle as a result of the follow-up action. Ultimately the valve pressure is slightly higher than it originally was, to overcome the initial decrease in the temperature of the heater.

It must be remembered that while in the above description the various pressure changes have been described in sequence they are actually continuous. As the flapper starts its initial movement the pressures begin to change, building up on the valve diaphragm to a maximum determined by the setting of the spring 40 and then gradually reducing at a rate dependent upon the adjustment of the restrictions 39 and 28. In this manner upon the occurrence of a change in the value of the heater temperature the valve 3 is either opened or closed, depending upon the direction of the deviation, an amount in excess of that necessary to return the condition to normal. The valve is then gradually returned to a position necessary to maintain the temperature at normal at a rate dependent upon the rate of change of the heater. This rate adjustment may be made in the field after the particular rate of temperature change of the heater has been determined by experiment. The over-correction of the valve, or initial effect as it is often called, and the gradual removal of the over-correction permits the departure from normal of the temperature to be quickly checked, with a rapid return to normal.

In order to control the temperature at different normal values it is necessary to adjust the initial position of flapper 15, relative to the nozzle 16. This may be accomplished by shifting the supporting link 14 to change the fulcrum point of lever 13. To this end the upper end of link 14 is pivoted to one arm of a bellcrank 47 that is also pivoted at 11. The second arm of the bellcrank 47 is connected by a link 48 to a crank 49 attached to a knob 50. In order to lower the control point, knob 50 will be rotated in a counterclockwise direction to move the parts into their dotted line positions. Thus flapper 15 is moved away from the nozzle 16, decreasing the pressure on valve 3. The valve will thereby close to permit less heating fluid to flow through pipe 2 and reduce the temperature of the heater.

Referring to Fig. 2 there is shown another type of mechanism for accomplishing the results of the instrument of Fig. 1. In this embodiment the follow-up motion of the flapper is followed by a reverse or compensating movement thereof. The link 22 in this case is attached at its right end to a support 51 that is rigidly fastened to a rod 52, each end of which is attached to the movable end wall of a bellows 53 or 54. The bellows 53 is fastened to a supporting plate 55 and along with a second bellows 56 forms a chamber 57 that is filled with liquid. The bellows 56 is surrounded by a cup-shaped protecting casing 58 that has an opening in it so that the exterior of the bellows 56 is subjected to atmospheric pressures.

In a like manner the bellows 54 is surrounded by a bellows 59 which forms a chamber 60 that is liquid filled and in communication with the chamber 57 by means of a pipe 61 having an adjustable restriction 62 in it. The bellows 54 and 59 are attached to a supporting plate 63 that also has attached to it and surrounding the bellows 59 a cup-shaped casing 64. The interior of this casing is connected with the interior of the bellows 36 by means of the pipe 30.

In the operation of this embodiment upon a decrease in the temperature of the heater the flapper 15 will move toward the nozzle 16 to throttle the flow therethrough. This builds up the pressure on the valve diaphragm to open the valve further and at the same time builds up pressure in the bellows 33 in a manner previously described. When the pressure in bellows 33 has built up sufficiently to overcome the force of spring 40 the bellows 36 will be compressed and force air into the casing 64. When this occurs the liquid in chamber 60 acts as a solid body and the compression of bellows 59 is transmitted directly to the bellows 54 and through the rod 52 and link 22 to the lever 21. Thus a follow-up motion tending to neutralize the original pressure change is obtained.

Because of the increased air pressure applied to the bellows 59 the liquid in chamber 60 is under a higher pressure than that in chamber 57. This liquid will therefore flow through the pipe 61 at a rate determined by the setting of restriction 62 from chamber 60 to chamber 57. As, due to their natural resiliency, the bellows 53 and 54 resume their normal lengths the link 22 will be slowly shifted to the right to bring the flapper 15 back toward its original position. Ultimately the flapper will come to rest at substantially its original point with an increased pressure in the system over that which was therein at the beginning of the change in temperature to compensate for the increase in load on the heater that caused the original temperature drop.

With this form of the invention, as in that of Fig. 1, the initially large increase in valve pressure produced in order to overcome the tension of spring 40 causes an opening of the valve 3 beyond that needed to correct the temperature change and a gradual closing of the valve to the correct point. Therefore, the temperature is rapidly brought back to normal.

The apparatus shown in Fig. 3 may be used with the flapper actuating mechanism of either Fig. 1 or Fig. 2, in place of the "kick" producing parts 33 to 46 of those figures. As shown, the apparatus of this figure produces the follow-up movement of the flapper 15 hydraulically rather than pneumatically as was previously described. To this end the bellows 25 of Fig. 1, if it is used with that apparatus or the space between bellows 59 and casing 64 if it is used with the apparatus of Fig. 2, must be filled with liquid. This, in some cases, is desirable since compression of the liquid is immediately transferred from one point to another, while a short lag may be produced while the pressure of a gas is building up in one place as a result of compression in another.

In this form the line 31, which is subjected to the valve pressure, leads to a chamber 65 formed between a cup-shaped casing 66 and a bellows 67, both of which are attached to a stationary supporting plate 68. The interior of the bellows 67 is filled with liquid and communicates with the interior of another bellows 69 that is attached at one end to the plate 68 and at its other end to a movable plate 70. The plate 70 is connected for movement with a second movable plate 71 by means of a pair of connecting members 72. A third liquid filled bellows 73 has one end attached to the plate 71 and its other end attached to a stationary plate 72. The interior of bellows 73 communicates with the interior of bellows 67 through a pipe 74 having an adjustable restriction 75 in it. This pipe and restriction serve the same purpose as pipe 38 and restriction 39 of Figs. 1 and 2. The interior of bellows 73 also communicates by means of line 30 with the bellows 25 or the chamber formed between bellows 59 and casing 64, as the case may be.

Instead of using a spring to determine the pressure increase to produce the impulse or kick as was previously described, the magnitude of the impulse is determined by the pressure in a bellows 76 located between the plates 70 and 71. This amounts to a pneumatic spring. The bellows 76 has attached to each end a plate 77 or 78, each provided with a cup-shaped depression, which plates bear against stationary supports 79 and 80, respectively, to limit the expansion of the bellows. The plate 70 has attached to and projecting from it a threaded stud 81 which is received in the depression of the plate 77. Surrounding the stud 81 is a collar 82 which bears against the plate 77 to limit upward movement of plate 70 with respect thereto. In a like manner downward movement of plate 71 relative to plate 78 is limited by a stud 86 that extends from plate 71 into the depression of plate 78 and is surrounded by a collar 83 that bears against the lower plate. The pressure in the bellows 76 is adjusted by a pressure regulator 84 located in a line 85 leading from some suitable source of fluid under pressure to the bellows.

In the operation of this form of the invention an increase in valve pressure will be transmitted to the chamber 65 through line 31. As the pressure builds up the bellows 67 will tend to contract forcing liquid into bellows 69 to expand the latter. This cannot happen, however, until the pressure in bellows 69 has increased enough to compress the bellows 76. When this occurs upward movement of plate 70 will compress the bellows 73, forcing the liquid therein through the pipe 30 to produce the follow-up movement of the flapper 15. Contemporaneously with the pressure increase in chamber 65 liquid is flowing at a suitable retarded rate through the pipe 74 to equalize the pressures in bellows 69 and 73. This will not take place, however, until after the pressure in bellows 69 has increased sufficiently to compress the bellows 73. The magnitude of the initial impulse or kick is determined by the pressure in the bellows 76 and its duration depends upon the adjustment of restriction 75.

From the above description it will be apparent that I have invented an instrument which is capable of magnifying the effect of a change in the value of a condition from normal on the control element in order to quickly stop the deviation and to quickly return the condition to its normal value. This magnified effect is then removed at a rate dependent upon the rate of change of the condition in order to prevent over shooting or hunting thereof.

While in accordance with the provisions of the statutes, I have illustrated and described the best form of my invention now known to be, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. An air control instrument having a bleed nozzle, a flapper valve therefor, means responsive to the value of a variable condition to relatively move said flapper and nozzle in either of two directions, fluid operated follow-up provisions in said air controller to relatively move said nozzle and flapper in the opposite direction to its original movement, a supply of fluid under pressure regulated by said movement, a control valve operated by the regulated pressure supply, a pair of opposed bellows mounted so that expansion of one will produce contraction of the other, spring means to oppose a change in length of said bellows, a fluid connection between said regulated supply of fluid and one of said opposed bellows, a fluid connection between the other of said opposed bellows and said fluid operated follow-up provisions, and a restricted fluid connection between said bellows.

2. In an air control instrument, a bleed nozzle, a flapper valve therefor, means responsive to the value of a condition to move said flapper relative to said nozzle, fluid operated follow-up provisions in said control instrument operative to move said flapper relative to said nozzle as a result of movement thereof by said means and in a direction to oppose the movement imparted by said means, a supply of fluid under pressure regulated by movement of said flapper relative to said nozzle, a control valve operated by the regulated pressure supply, a connection between the regulated pressure supply and said fluid operated follow-up provisions including a pair of opposed bellows, adapted to change in length upon the application of pressure thereto, spring means acting to prevent a change in length of said bellows, a fluid connection between one of said bellows and said regulated fluid pressure, a fluid connection between said other bellows and said fluid operated follow-up provisions, and a restricted fluid connection between said bellows.

3. An air control instrument including a port, a valve for said port, a supply of air under pressure connected to said port and adjusted as said valve is moved relative to said port to vary the bleed of air therethrough, a control valve operated by the adjusted pressure, a device movable in response to variations in the value of a condition operable to move said valve relative to said port and produce an adjustment of said pressure, fluid operated follow-up means to reversely move said valve upon a movement thereof by said device, means to operate said fluid operated follow-up provisions pneumatically from changes in the pressure of said air supply comprising a pair of opposed, expansible pressure chambers, a fluid connection between said adjusted air pressure and one chamber, a fluid connection between said fluid operated follow-up provisions and the other of said chambers, a restricted fluid connection between said chambers, and adjustable spring means to prevent expansion of said chambers until a predetermined pressure change has occurred therein.

4. An air control instrument including a port, a valve therefor, a supply of air under pressure regulated by relative movement of said valve and port, a control means operated by the adjusted pressure, a device responsive to changes in a variable condition to move said valve relative to said port, fluid operated follow-up provisions to move said valve relative to said port in a direction opposite to and as a result of a movement produced by said device, means to operate said fluid operated follow-up provisions pneumatically as a result of a movement of said valve by said device comprising a pair of opposed, expansible chambers, a fluid connection between one of said chambers and said adjusted air supply, a fluid connection between the other of said chambers and said fluid operated follow-up provisions, a restricted fluid connection between said chambers, and adjustable spring means to resist a change in size in said chambers until a predetermined pressure change has occurred in one of them.

5. In an air control instrument, an impulse unit comprising a first and a second bellows each fixedly mounted on one end and attached for opposing movement at their opposite ends, a third bellows mounted between the first two bellows, means attached to each of said first bellows to compress said third bellows upon expansion of either of the first two, means to supply a pressure to said third bellows to thereby oppose expansion of either of said first two bellows, means to apply pressure to one of said first or second bellows to overcome the force of the third bellows, means operated by the other of said first or second bellows to prevent an increase of the pressure beyond a predetermined point, and means to gradually reduce said pressure.

COLEMAN B. MOORE.